United States Patent

[11] 3,621,143

[72] Inventor Charles William Chambers, Jr.
Amherst, Ohio

[21] Appl. No. 813,611
[22] Filed Apr. 4, 1969
[45] Patented Nov. 16, 1971
[73] Assignee Lorain Products Corporation

[54] CURRENT-CONTROLLED VOLTAGE BOOSTER FOR TELEPHONE SYSTEMS
12 Claims, 1 Drawing Fig.

[52] U.S. Cl. .......... 179/16 F
[51] Int. Cl. .......... H04n 7/04
[50] Field of Search .......... 179/16 F

[56] References Cited

UNITED STATES PATENTS

| | | | |
|---|---|---|---|
| 2,055,647 | 9/1936 | Bowne | 179/27 |
| 3,187,104 | 6/1965 | Ebel | 179/16 F |
| 3,514,543 | 5/1970 | Rae | 179/16 F |
| 3,531,598 | 9/1970 | McNair | 179/16 F |

OTHER REFERENCES

G.E. SCR Manual, Third Edition pp. 43–45, 49

*Primary Examiner*—Kathleen H. Claffy
*Assistant Examiner*—Jan S. Black
*Attorney*—John Howard Smith

ABSTRACT: A voltage booster circuit for telephone systems utilizing reverse battery supervision. First and second switches control the connection of respective auxiliary sources in series between a central office battery and a subscriber circuit. The conduction of said switches are controlled in accordance with the polarity with which the central office battery is connected to the subscriber circuit to connect between the central office battery and the subscriber circuit that auxiliary source which is in power-aiding relationship to the central office battery. The conduction period of one of the switches is made to predominate over the conduction period of the other during dialing and ringing so as to facilitate the transmission of dial pulses and the generation of a DC boost for energizing a trip relay during ringing.

PATENTED NOV 16 1971
3,621,143
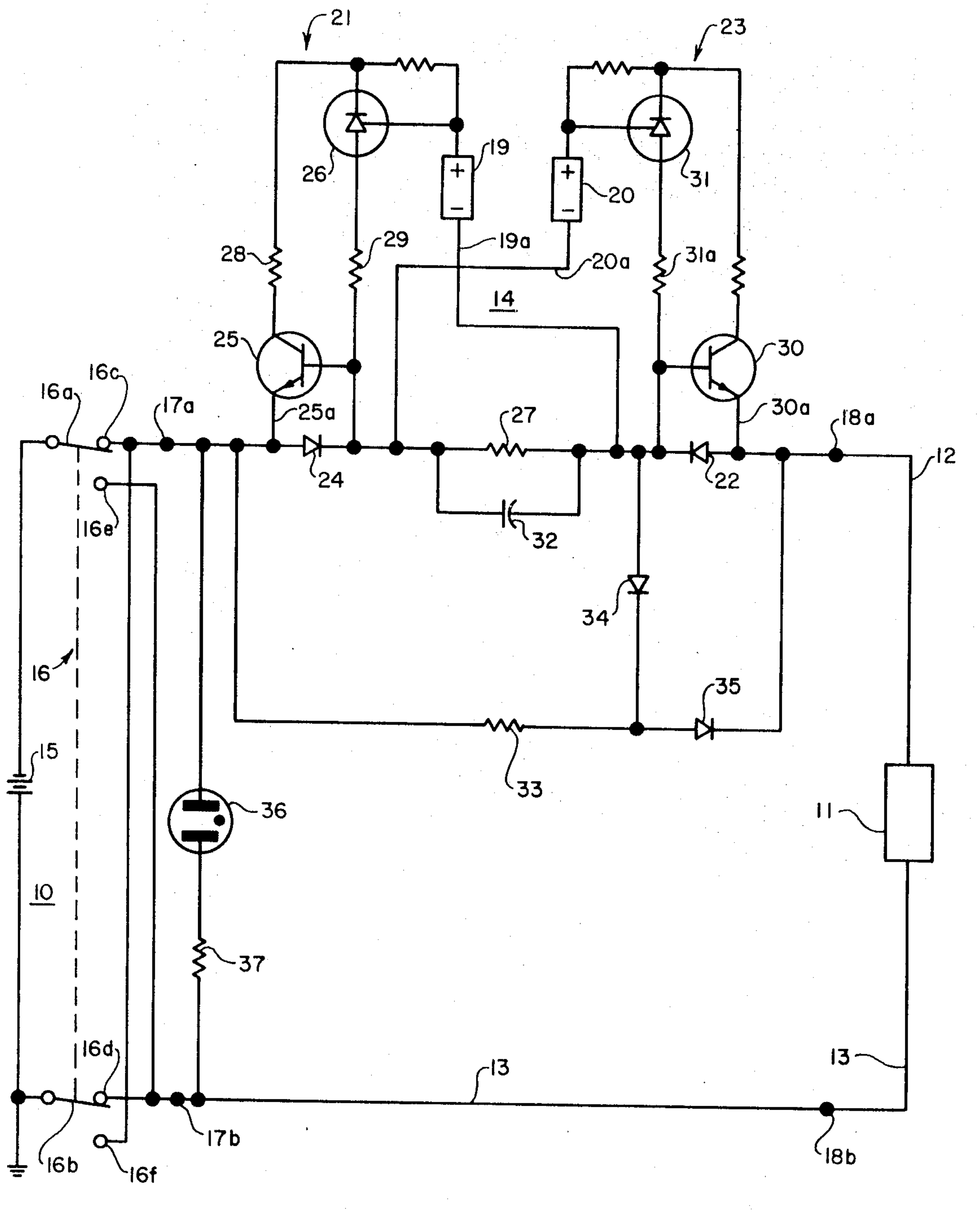
INVENTOR.
C. WILLIAM CHAMBERS, JR.
BY John Howard Smith

CURRENT-CONTROLLED VOLTAGE BOOSTER FOR TELEPHONE SYSTEMS

BACKGROUND OF THE INVENTION

The present invention relates to voltage booster circuits and is directed more particularly to voltage booster circuits for telephone systems which utilize reverse battery supervision.

One difficulty in establishing an adequate DC operating current in each of a large number of subscriber telephone circuits is that the different subscriber circuits present widely differing resistances to the central office equipment. These differing resistances result from differences in the lengths of telephone line which connect individual subscriber telephone sets to the central office. To provide a satisfactory current flow to all subscribers despite these differing resistances, it has been found desirable and economical to energize the majority of subscriber telephone circuits from a central office battery of generally adequate terminal voltage, and to apply a higher voltage to the remaining, more remote subscriber circuits of resistance too high to operate directly from the central office batter. This higher voltage may be produced most simply by connecting a DC auxiliary source in series-aiding relationship between the central office battery and each of the high-resistance subscriber circuits. Until the present invention, however, this approach could not be utilized in telephone systems subject to reverse battery supervision, that is telephone systems wherein the polarity of the connections of the central office battery to each subscriber circuit are changed from time to time for various supervisory and control purposes.

In telephone systems utilizing reverse battery supervision, a DC booster source which is in series-aiding relationship to the central office battery when the latter is connected across a subscriber circuit with a first polarity, will be in bucking relationship to the central office battery when the latter is connected across the same subscriber circuit with the opposite polarity. Thus, it is necessary to provide a voltage booster circuit for each high-resistance subscriber circuit, which booster circuit will reverse the polarity of the serially added auxiliary voltage each time the connections of central office battery to that subscriber circuit are reversed to maintain a series-aiding relationship.

While it is essential that a voltage booster control circuit coordinate the polarity of a serially added auxiliary voltage with that of a central office battery, other operative properties are equally essential. A voltage booster circuit must, for example, introduce its voltage boost without interfering with other telephone system operations such as dialing, and must furnish a net DC boost voltage for energizing a trip relay when the subscriber picks up his handset during ringing.

In addition, voltage booster circuits which are located far from the central office may have difficulty in determining the polarity with which the central office battery is connected to the telephone line. This difficulty occurs because the increased current, caused by the operation of the voltage booster circuit, may cause a voltage drop in the telephone line between the central office battery and the voltage booster circuit which is comparable to the voltage of the central office battery. Under these conditions the voltage booster circuit may respond to the voltage drop in the resistance of the telephone line rather than the voltage of the central office battery. Consequently, it is desirable to determine the polarity of the connections of the central office battery to the telephone line by sensing the direction of subscriber circuit current flow produced by the central office battery, a quantity which is the same everywhere in the line. This property is most important in telephone systems having foreign exchange pairs (pairs which lead to subscribers located in an area normally serviced by a different central office).

SUMMARY OF THE INVENTION

Accordingly, it is an object of the invention to provide a voltage booster circuit adapted to insert an auxiliary source in series-aiding relationship between a central office battery and a subscriber circuit despite reversals in the polarity of the connections of the central office battery to the subscriber circuit.

It is another object of the invention to provide a voltage booster circuit of the above character which increases the flow of subscriber circuit current during dialing without distorting the dial pulse waveform.

Still another object of the invention is to provide a voltage booster circuit which provides a net DC boost voltage for energizing a trip relay during ringing, despite reversals in the polarity of the subscriber circuit voltage during ringing.

It is yet another object of the invention to provide a voltage booster circuit of the above character which can be located anywhere in a telephone line between the central office battery and the subscriber set.

Yet another object of the invention is to provide a current responsive voltage booster circuit wherein the conduction of switch means, which controls the flow of subscriber circuit current through a DC booster source disposed in power-aiding relationship to the central office battery during dialing, is maintained despite the reduction of the subscriber circuit current to zero during dial pulse interruptions.

DESCRIPTION OF THE DRAWINGS

The single FIG. is a schematic diagram of an exemplary form of the invention.

DESCRIPTION OF THE INVENTION

Referring to the FIG. there is shown a central office equipment section 10 for energizing a subscriber telephone set 11 through subscriber line conductors 12 and 13 and a voltage booster circuit 14. Central office equipment section 10 includes a central office battery 15 and a polarity reversal switch 16. When movable contacts 16*a* and 16*b* of switch 16 are closed against fixed contacts 16*c* and 16*d* respectively, central office battery 15 renders a central office terminal 17*a* negative from a central office terminal 17*b*. When, however, movable contact 16*a* and 16*b* are closed against fixed contacts 16*e* and 16*f* respectively, central office battery 15 renders central office terminal 17*a* positive from central office terminal 17*b*. The two positions of switch 16 correspond to the two central office terminal polarities utilized for reverse battery supervision.

To the end that the subscriber circuit-operating voltage, that is the voltage between subscriber circuit terminals 18*a* and 18*b*, may be greater than the voltage appearing between central office terminals 17*a* and 17*b*, despite changes in the position of polarity-reversing switch 16, voltage booster circuit 14 includes suitable DC voltage booster sources 19 and 20. Additionally, the voltage booster circuit 14 includes first and second switching circuit means 21 and 23 respectively. These switching circuits when conducting, initiate the flow of subscriber circuit current through the respective, serially connected DC booster sources. The polarities of booster sources 19 and 20 are arranged to additively increase the flow of current through switching circuit means 21 and 23 respectively.

When central office terminal 17*b* is positive from central office terminal 17*a*, first switch means 21 conducts to connect booster source 19 between terminals 18*a* and 17*a* through diode 22 and conductors 19*a* and 25*a*. Under these conditions, subscriber circuit terminal 18*b* is rendered positive from subscriber circuit terminal 18*a* by a voltage substantially equal to the sum of the voltages of central office battery 15 and voltage booster source 19. When, however, central office terminal 17*a* is positive from central office terminal 17*b*, second switching circuit means 23 conducts to connect booster source 20 between terminals 17*a* and 18*a* through diode 24 and conductors 20*a* and 30*a*. Under these conditions, terminal 18*a* is rendered positive from terminal 18*b* by a voltage substantially equal to the sum of the voltages of central office battery 15 and voltage booster source 20.

To the end that booster source 19 may be connected between terminals 17*a* and 18*a* in series, power-aiding relationship to central office battery 15 when central office terminal 17*b* is positive from central office terminal 17*a*, the first switch means 21 includes a source current responsive conducting means 25, here shown as an NPN transistor, and a controlled conducting means 26, here shown as a thyristor. Contrary to conventional thyristor usage, wherein a pulse of gate-to-cathode current initiates an avalanche of anode-to-cathode current in a forward biased device, thyristor 26 is utilized with the gate terminal positive with respect to both the anode and the cathode terminals thereof to control the flow of gate-to-cathode current in accordance with the flow of gate-to-anode current. Thus, thyristor 26 is utilized as a variable conducting means, the control circuit of which is disposed between the gate and cathode terminals and the power circuit of which is disposed between the gate and anode terminals.

Because the gate cathode control circuit of thyristor 26 connects the collector emitter power circuit of transistor 25 between the positive terminal of booster source 19 and central office terminal 17*a*, and because the gate anode power circuit of thyristor 26 connects the base emitter control circuit of transistor 25 between the same two points, a control circuit current produced in transistor 25 will initiate a regenerative increase in the conduction of both transistor 25 and thyristor 26 to connect the positive terminal of booster source 19 to central office terminal 17*a* as through a closed switch. Thus, the base emitter control circuit of transistor 25 also functions as the control circuit for switching circuit 21.

The manner in which the conduction of switch means 21 is initiated will now be described. When central office terminal 17*b* is positive from central office terminal 17*a*, current flows from terminal 17*b* to terminal 18*a* through conductor 13, subscriber station 11, conductor 12 and continues to terminal 17*a* through diode 22, a control current conducting means 27, and the base emitter control circuit of transistor 25. This causes transistor 25 to conduct through its collector emitter circuit and results in the flow of current from terminal 17*b* to terminal 17*a* through diode 22, a conductor 19*a*, booster source 19, the gate cathode control circuit of thyristor 26, a current-limiting resistor 28, and the collector-emitter power circuit of transistor 25. Because this gate cathode control current in thyristor 26 initiates a gate anode current therein, as described previously, the conduction of transistor 25 results in the flow of current from terminal 17*b* to terminal 17*a* through diode 22, conductor 19*a*, booster source 19, the gate anode circuit of thyristor 26, a capacitance multiplier resistor 29 (to be more fully described presently) and the base emitter control circuit of transistor 25. It will be seen, therefore, that the conduction of transistor 25 increases the conduction of thyristor 26 which, in turn, increases the conduction of transistor 25. Thus, once conduction is triggered in transistor 25, the conduction of transistor 25 and thyristor 26 increases regeneratively until booster source 19 is connected between central office terminal 17*a* and subscriber circuit terminal 18*a* as through a closed switch.

To the end that booster source 20 may be connected in series, current conducting relationship between terminals 17*a* and 18*a* when central office terminal 17*a* is positive from central office terminal 17*b*, second switch means 23 includes a source current responsive conducting means 30 and a controlled conducting means 31. These conducting means serve the functions described previously with reference to transistor 25 and thyristor 26, respectively. Thus, when terminal 17*a* is positive with respect to 17*b*, a current flows from the former to the latter through diode 24, trigger current conducting resistor 27, the base emitter circuit of transistor 30 and the subscriber circuit which initiates a regenerative increase in the conduction of variable conducting means 30 and 31 to connect booster source 20 between central office terminal 17*a* and subscriber circuit terminal 18*a* as through a closed switch.

In view of the foregoing, it is apparent that the conduction of switch means 21 and 23 are controlled in accordance with the current which central office battery 15 produces through trigger current conducting resistor 27 and the control circuits of switching circuits 21 or 23 to insert between terminal 17*a* and 18*a* that one of the booster sources 19 or 20 which additively increases the voltage between subscriber circuit terminals 18*a* and 81*b*.

To the end that first and second switch means 21 and 23 are prevented from conducting simultaneously, there is provided reverse current bypass means 22 and 24, which here takes the form of suitable diodes. As described previously, the conduction of switch means 21 causes subscriber circuit current to flow through diode 22. Because the voltage developed across diode 22 during the conduction of switch means 21 is arranged to reverse bias the base emitter control circuit of transistor 30, it is apparent that switch means 23 cannot be rendered conducting while switch means 21 is conducting. In a similar manner the conduction of switch means 23 through diode 24 prevents the conduction of switch means 21 when switch means 23 is conducting.

In order to filter the voltage established between terminals 17*a* and 18*a* by booster network 14 and in order to bypass the AC or voice signal component of the subscriber circuit current around booster network 14, a capacity 32 is provided. In the present embodiment, capacitor 32 is arranged to affect the operation of the central office and subscriber circuits as if a capacitor larger than capacitor 32 were connected between terminals 17*a* and 18*a*. This is achieved by connecting capacitor 32 in capacitance-multiplying relationship to transistors 25 and 30. When, for example, switch means 21 is conducting, resistors 29 and 27 cause capacitor 32 to affect the operation of the central office subscriber circuit as if a capacitor of larger value were connected between terminals 17*a* and 18*a*, the amount of capacitance multiplication being determined by the gain of transistor 25. When, however, switch means 23 is conducting, resistors 31*a* and 27 cause capacitor 32 to affect the operation of the central office subscriber circuit as if a capacitor of larger value were connected between terminals 17*a* and 18*a* , the amount of capacitance multiplication being determined by the gain of transistor 30.

Because capacitor 32 prevents the appearance of an AC voltage between terminals 17*a* and 18*a* under both operative conditions of booster network 14, it is apparent that the latter capacitor serves as an AC short across the output of booster network 14. Accordingly, any AC voltage components generated from within booster network 14 (as, for example, ripple voltages present across the outputs of DC booster sources 19 and 20 if the latter should be AC to DC converters energized from commercial AC power) are prevented from appearing across the output of booster network 14 where they would detrimentally affect voice transmission through the subscriber circuit. Further, the AC or voice components of the subscriber circuit current are shunted around booster network 14 by capacitor 32, thereby preventing any substantial portion of the desired voice signal from being unavailable to the listening party. Thus, capacitor 32, in effect, isolates AC signals present in booster network 14 from those AC signals present in the subscriber circuit and vice versa.

In the provision of booster circuits of the type here involved in conjunction with a filtering network having sufficient capacitance to assure a satisfactory voice signal, it has been found that the introduction of the necessary capacitance can also introduce undesirable effects in the dialing operation. As will be seen presently, this invention contemplates the provision of means which eliminates these deficiencies in dialing due to high capacitance and at the same time affords a new DC boost for dripping during ringing. As will also be seen presently, resistor 33 and diodes 34 and 35 contribute to the above advantages.

Dial pulses are interruptions in the flow of subscriber circuit current caused by the opening and closing of a dial contact at the subscriber set, and typically have durations in the order of milliseconds. Because relays in the central office must respond to these dial pulses, it is important that any voltage booster circuitry interposed between the central office and a subscriber circuit does not shorten the effective duration of the dial pulse. Dial pulse distortions may arise if the dynamic response time of switch means 21 is comparable to the duration of the dial pulse. Prior to the present invention, the problem was that if the booster network had sufficient capacitance to meet the AC filtering requirements, the dynamic response of the network slowed to the point where dial pulse distortions occurred.

To the end that the booster network 14 satisfies its voltage-boosting and AC filtering requirements and additively increases the dialing current without interfering with the duration or shape of dialing pulses, there is provided herein a holding current conducting resistor 33 and isolating means which here takes the form of diode 35. In accordance with the invention, the resistor 33 is arranged to maintain conduction in switch means 21 during dialing despite interruptions in the subscriber circuit current which would otherwise reduce the current therethrough below the level required to sustain conduction therein. Thus, because the switch means 21 which conducts during dialing is not turned off and on during the dial pulse, the undesired distortion of the dial pulses does not occur.

In accordance with the telephone practice of always establishing the same predetermined central office terminal polarity during dialing, it is assumed that the dialing polarity is such that dial pulse interruptions always occur when current flows through switch means 21. Accordingly, a holding current conducting means 33, herein shown as a resistor, provides a path for maintaining flow of holding current for switch means 21 during interruptions in the flow of subscriber circuit current. These interruptions would, in the absence of holding current conducting means 33, turn switch means 21 off at the beginning of each dial pulse and turn the latter on again at the end of each dial pulse and thereby introduce transients which would distort the dial pulse waveform. This holding current is supplied from booster source 19 through switch means 21, holding current-conducting resistor 33, diodes 35 and 22 and conductor 19*a*. Diode 35 prevents the flow of a holding current from booster source 20 through switch means 23. It will be understood, of course, that if the opposite dialing polarity were utilized, resistor 33 and diodes 34 and 35 must be reconnected so as to serve their holding current maintaining function for switch means 23.

During ringing, after a subscriber picks up the handset, a mixed AC and DC current is supplied from the central office to the subscriber station. Because both the positive and negative going peak values of the AC component of the ringing voltage are usually greater than the DC central office battery voltage, the central office terminal polarity changes during the ringing voltage cycle. Consequently, a voltage booster circuit which follows both polarities of the central office terminal voltage will not produce the net DC boost voltage necessary to increase the DC component of the mixed DC and AC ringing current. This is because the boost voltage added during the period when the central office terminal voltage has a polarity which favors the DC component of the ringing current is canceled by the boost voltage added during the period when the central office terminal voltage has a polarity which opposes the DC component of the ringing current. This DC component of current is required to energize a DC sensitive trip relay which terminates the ringing activity when the subscriber answers the telephone.

To the end that booster network 14 may furnish a net DC boost voltage for increasing the DC component of the ringing current, there is provided a unidirectional conducting means, which here takes the form of a diode 34. Diode 34 operates with resistor 33 and 34, during ringing, to maintain conduction in switch means 21 for a predetermined time after the central office terminal voltage attains the polarity previously associated with the conduction of switch means 23. As a result, switch means 21, which inserts a boost voltage that increases the DC component of the ringing current, conducts for a greater portion of the ringing voltage cycle than switch means 23 that inserts a boost voltage which opposes the DC component of the ringing current. Thus, a net DC voltage boost is provided.

In the following description of the operation of diodes 34 and 35 and resistor 33 it is assumed that, in accordance with telephone system practice, a single, predetermined DC central office terminal polarity is established during ringing. It is further assumed that the DC central office terminal polarity established during ringing is such as to produce current flow through switch means 21. It will be understood that if the opposite DC central office terminal polarity were utilized, diodes 34 and 35 must be connected to switch means 21 instead of to switch means 23 as shown in the drawing.

When central office terminal 17*b* is positive from central office terminal 17*a*, switch means 21 connects booster source 19 between terminals 18*a* and 17*a* in power-aiding relationship to the central office terminal voltage. Under these conditions, capacitor 32 is charged positive on the left as a result of current flow from booster source 19 through the path including the gate anode circuit of thyristor 26, resistor 29, capacitor 32, and conductor 19*a*. If the central office terminal voltage should reverse while the above conditions exist, capacitor 32 will, for a time, maintain conduction in switch means 21 by discharging through two paths, both of which include the base emitter circuit of transistor 25. The first discharge path includes the base emitter circuit of transistor 25, central office equipment section 10, conductor 13, subscriber station 11, conductor 12, and diode 22. The second discharge path includes the base emitter circuit of transistor 25, resistor 33 and diodes 35 and 22. Because both of these currents flow through the base emitter control circuit of transistor 25, a high degree of conduction is maintained in switch means 21. Consequently, a substantial current flows from booster source 19 through the gate anode circuit of thyristor 26, resistor 29, capacitor 32 and conductor 19*a* which prolongs the discharge of capacitor 32.

When, however, central office terminal 17*a* is positive from central office terminal 17*b*, switch means 23 connects booster source 20 between terminals 17*a* and 18*a* in power-aiding relationship to the central office terminal voltage. Under these conditions, capacitor 32 is charged positive on the right as a result of the current flow from booster source 20 through the path including the gate anode circuit of thyristor 31, resistor 31*a*, capacitor 32 and conductor 20*a*. If the central office terminal voltage should reverse while the above conditions exist, capacitor 32 will, for a time, maintain conduction in switch means 23 by discharging through two paths, only one of which includes the base emitter circuit of transistor 30. The first discharge path includes the base emitter circuit of transistor 30, conductor 12, subscriber station 11, conductor 13, central office equipment section 10, and diode 24. The second discharge path includes diode 34, resistor 33 and diode 24. Because transistor 30 is provided less base emitter current than was provided to transistor 25 under the above-described similar circumstances, switch means 23 is rendered only partially conducting. Consequently, the current flow from booster source 20 through the gate anode circuit of thyristor 31, resistor 31*a*, capacitor 32 and conductor 20*a* which prolongs the discharge of capacitor 32 is less than that described previously with reference to thyristor 26. Thus, the discharge of capacitor 32 when the latter is initially positive on the right, takes less time than the discharge of capacitor 32 when the latter is initially positive on the left.

In view of the foregoing, it is apparent that diode 35 causes switch means 21, which controls the insertion of a boost voltage beneficial to tripping, to remain conducting for a substantial portion of the time during which central office terminal 17*a* is positive from central office terminal 17*b*. Thus, the boost voltage added during the period when the central office terminal voltage favors the DC component of the ringing current is not substantially canceled by the boost voltage added during the period when the central office terminal voltage opposes the DC component of the ringing current.

If a still greater DC boost for tripping during ringing is required, trip relay biasing means 36, herein comprising a neon tube having a breakdown voltage greater than the central office battery voltage and its current-limiting resistor 37 may be connected across central office terminals 17*a* and 17*b*. This biasing means breaks down and draws more DC current through the coil of the central office trip relay during those half cycles of the ringing voltage which are additive to the voltage of the central office battery than is drawn therethrough, after breakdown, during those half cycles of the ringing voltage which are in opposition to the central office battery voltage. Consequently, the flow of DC current in the coil of a trip relay in the direction beneficial to tripping predominates over the flowing therein in opposition to tripping. The amount of biasing thus provided may be varied by selecting neon tubes with differing breakdown voltages.

An important feature of the present invention is that booster network 14 operates in the manner described above during both dialing and ringing, without detrimentally affecting the provision of a DC voltage boost before and after normal DC reversals in the central office terminal polarity due to reverse battery supervision.

In view of the foregoing it is apparent that a voltage-boosting arrangement constructed in accordance with the invention will provide a DC boost voltage in power-aiding relationship between a pair of central office terminals and a pair of subscriber circuit terminals despite reversals in the polarity of the voltage appearing between the central office terminals and yet will provide the aforementioned net DC boost voltage having a polarity beneficial to tripping during ringing and at the same time will assure that adequate voltage boosting for dialing will be present and will not distort the dialing pulses which results in the production of wrong numbers.

It will be understood that the foregoing embodiment is for explanatory purposes only and may be changed and modified without departing from the spirit and scope of the appended claims.

What is claimed is:

1. In a voltage-boosting arrangement for telephone systems utilizing reverse battery supervision, in combination, central office terminal means and subscriber circuit terminal means, a plurality of switching circuit means each having a power circuit and a control circuit, means for connecting the power circuits of said switching circuit means between said central office and subscriber circuit terminal means, voltage booster source means, means for connecting said voltage booster source means in series with the power circuits of respective switching circuit means whereby the conduction of at least one of said switching circuit means connects a voltage booster source means with a predetermined polarity between said central office and subscriber circuit terminal means, means for connecting the control circuits of said switching circuit means between said central office and subscriber circuit terminal means, holding current conducting means for maintaining a flow of current through a predetermined one of said switching circuit means, means for connecting said holding current conducting means across the circuit including the power circuit of said predetermined one of said switching circuit means and the respective voltage booster source means.

2. In a voltage-boosting arrangement for telephone systems utilizing reverse battery supervision, in combination, central office terminal means and subscriber circuit terminal means, first and second DC voltage booster source means, first switching circuit means for connecting said first DC voltage booster source means with a first polarity between said central office and subscriber circuit terminal means, second switching circuit means for connecting said second DC voltage booster source means with a second polarity between said central office and subscriber circuit terminal means, a power circuit and a control circuit in said first and said second switching circuit means, control current conducting means, means for connecting said control current conducting means to said central office and subscriber circuit terminal means through the control circuits of said first and second switching circuit means, holding current-conducting means for maintaining a flow of current through a predetermined one of said switching circuit means, means for connecting said holding current conducting means across the circuit including the power circuit of said predetermined one of said switching circuit means and the respective voltage booster source means.

3. In a voltage-boosting arrangement for telephone systems utilizing reverse battery supervision, in combination, central office terminal means and subscriber circuit terminal means, first and second source current responsive conducting means, first and second controlled conducting means, a control circuit and a power circuit in each of said conducting means, means for connecting the power circuit of said first source current responsive conducting means and the control circuit of said first controlled conducting means between said central office and subscriber circuit terminal means, means for connecting the control circuit of said first source current responsive conducting means and the power circuit of said first controlled conducting means between said central office and subscriber circuit terminal means, means for connecting the power circuit of said second source current responsive conducting means and the control circuit of said second controlled conducting means between said subscriber circuit and central office terminal means, means for connecting the control circuit of said second source current responsive conducting means and the power circuit of said second controlled conducting means between said subscriber circuit and central office terminal means, first switching circuit means including said first source current responsive conducting means and said first controlled conducting means, second switching circuit means including said second source current responsive conducting means and said second controlled conducting means, first and second voltage booster source means, means for connecting said voltage booster source means in series with respective switching circuit means whereby the conduction of said switching circuit means connects a voltage booster source means with a predetermined polarity between said central office and subscriber circuit terminal means, means for connecting the control circuits of said source current responsive conducting means between said central office and subscriber circuit terminal means, holding current conducting means for maintaining a flow of current through a predetermined one of said switching circuit means, means for connecting said holding current conducting means across the circuit including said predetermined one of said switching circuit means and the respective voltage booster source means.

4. In a voltage booster arrangement for telephone systems utilizing reverse battery supervision, in combination, central office terminal means and subscriber circuit terminal means, first and second switching circuit means each having a power circuit and a control circuit, means for connecting the power circuits of said switching circuit means between said central office and subscriber circuit terminal means, first and second voltage booster source means, means for connecting said voltage booster source means in series with the power circuits of respective switching circuit means, means for connecting the control circuits of said switching circuit means between said central office and subscriber circuit terminal means, first and second reverse current bypass means for bypassing current around predetermined ones of said switching circuit means, means for connecting said reverse current bypass means in series with the power circuits of respective switching circuit means, means for connecting said first reverse current bypass means across the control circuit of said second switching circuit means and means for connecting said second reverse current bypass means across the control circuit of said first switching circuit means.

5. In a voltage-boosting arrangement for telephone systems utilizing reverse battery supervision, in combination, central office terminal means and subscriber circuit terminal means, first and second switching circuit means each having a power circuit and a control circuit, first and second voltage booster source means, means for connecting a first end of the power circuit of said first switching circuit means to said central office terminal means, means for connecting said first voltage booster source means between said subscriber circuit terminal means and the other end of the power circuit of said first switching circuit means, means for connecting a first end of the power circuit of said second switching circuit means to said subscriber circuit terminal means, means for connecting said second voltage booster source means between said central office terminal means and the other end of the power circuit of said second switching circuit means, means for connecting the control circuits of said first and second switching circuit means between said central office and subscriber circuit terminal means, a holding current conducting means for maintaining a flow of current through a predetermined one of said switching circuit means, means for connecting said holding current conducting means across the circuit including the power circuit of said predetermined one of said switching circuit means and the respective voltage booster source means.

6. In combination with a voltage-boosting arrangement as set forth in claim 1, capacitance means, means for connecting said capacitance means between the control circuits of said switching circuit means, first unidirectional conducting means; means for connecting said first unidirectional conducting means, the control circuit of one of said switching circuit means, said capacitance means and said holding current conducting means in a closed current-conducting path; second unidirectional conducting means; means for connecting said second unidirectional conducting means, said capacitance means and said holding current conducting means in a closed current-conducting path.

7. In combination with a voltage-boosting arrangement as set forth in claim 1, capacitance means, means for connecting said capacitance means across said holding current conducting means through the control circuit of said predetermined one of said switching circuit means when said capacitance means is charged with a first polarity and means for connecting said capacitance means across said holding current conducting means when said capacitance means is charged with a second polarity.

8. In combination with a voltage-boosting arrangement as set forth in claim 3, capacitance means, means for connecting said capacitance means between the control circuits of said source current responsive conducting means, a plurality of resistance means, means for connecting one of said resistance means in parallel with said capacitance means and means for connecting another of said resistance means between the control circuit of one of said source current responsive conducting means and the power circuit of the respective controlled conducting means.

9. In combination with a voltage-boosting arrangement as set forth in claim 3, capacitance means, means for connecting said capacitance means between the control circuits of said source current responsive conducting means, a plurality of resistance means, means for connecting one of said resistance means across said capacitance means, means for connecting another of said resistance means between the control circuit of one of said source current responsive conducting means and the power circuit of the respective controlled conducting means, first unidirectional conducting means, means for connecting said first unidirectional conducting means, the control circuit of one of said source current responsive conducting means, said capacitance means and said holding current conducting means in a closed current-carrying path, second unidirectional conducting means, means for connecting said second unidirectional conducting means, said capacitance means and said holding current conducting means in a closed current-carrying path.

10. In combination with a voltage-boosting arrangement as set forth in claim 4, capacitance means, means for connecting said capacitance means between the control circuits of said switching circuit means, holding current conducting means for maintaining a flow of current through a predetermined one of said switching circuit means, means for connecting said capacitance means to one end of said holding current conducting means through the control circuit of one of said switching circuit means, means for connecting said capacitance means to the other end of said holding current conducting means through one of said reverse current bypass means when said capacitance means is charged with a first polarity and means for connecting said capacitance means across said holding current conducting means when said capacitance means is charged with a second polarity.

11. In a voltage-boosting arrangement for telephone systems utilizing reverse battery supervision, in combination, central office terminal means and subscriber circuit terminal means, first and second source responsive conducting means, first and second controlled conducting means, a control circuit and a power circuit in each of said conducting means, means for connecting the power circuit of said first source responsive conducting means between said central office and subscriber circuit terminal means through the control circuit of said first controlled conducting means, means for connecting the control circuit of said first source responsive conducting means between said central office and subscriber circuit terminal means through the power circuit of said first controlled conducting means, means for connecting the power circuit of said second source responsive conducting means between said subscriber circuit and central office terminal means through the control circuit of said second controlled conducting means, means for connecting the control circuit of said second source responsive conducting means between said subscriber circuit and central office terminal means through the power circuit of said second controlled conducting means, first and second voltage booster source means, means for connecting said first voltage booster source means between, said central office and subscriber circuit terminals through said first source responsive conducting means and through said first controlled conducting means to establish a first boost voltage polarity, means for connecting said second voltage booster source means between said central office and subscriber circuit terminal means through said second source responsive conducting means and through said second controlled conducting means to establish a second boost voltage polarity, means for connecting the control circuits of said source responsive conducting means between said central office and subscriber circuit terminals, first reverse current bypass means for conducting current through said first voltage booster source means and for reverse biasing the control circuit of said second source responsive conducting means, second reverse current bypass means for conducting current through said second voltage booster source means and for reverse biasing the control circuit of said first source responsive conducting means, means for connecting said first reverse current bypass means across the control circuit of said second source responsive conducting means and means for connecting said second reverse current bypass means across the control circuit of said first source responsive conducting means.

Claim 12. In combination with a voltage-boosting arrangement as set forth in claim 11, capacitance means, means for connecting said capacitance means between the control circuits of said source responsive conducting means, a plurality of resistance means, means for connecting one of said resistance means across said capacitance means, and means for connecting another of said resistance means between the control circuit of one of said source responsive conducting means and the power circuit of the respective controlled conducting means.

* * * * *

UNITED STATES PATENT OFFICE
CERTIFICATE OF CORRECTION

Patent No. 3,621,143 Dated November 16, 1971

Inventor(s) Charles W. Chambers, Jr.

It is certified that error appears in the above-identified patent and that said Letters Patent are hereby corrected as shown below:

Column 1, line 22, change "batter" to --battery--.

Column 2, line 45, change "circuit-operating" to --circuit operating--.

Column 4, line 22, change "capacity" to --capacitor--.

Column 4, line 65, change "new" to --net--.

Column 4, line 66, change "dripping" to --tripping--.

Column 5, line 67, change "34" to --35--, both occurrences.

Column 5, line 68, after "and" insert --diode--.

Signed and sealed this 27th day of June 1972.

(SEAL)
Attest:

EDWARD M.FLETCHER,JR.
Attesting Officer

ROBERT GOTTSCHALK
Commissioner of Patents